United States Patent
Oved

(10) Patent No.: US 10,387,358 B2
(45) Date of Patent: Aug. 20, 2019

(54) MULTI-PCIE SOCKET NIC OS INTERFACE

(71) Applicant: Mellanox Technologies, Ltd., Yokneam (IL)

(72) Inventor: Tzahi Oved, Ramat Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 125 days.

(21) Appl. No.: 15/480,407

(22) Filed: Apr. 6, 2017

(65) Prior Publication Data
US 2018/0232334 A1    Aug. 16, 2018

Related U.S. Application Data

(60) Provisional application No. 62/458,045, filed on Feb. 13, 2017.

(51) Int. Cl.
G06F 13/42    (2006.01)
H04L 29/06    (2006.01)

(52) U.S. Cl.
CPC ...... G06F 13/4282 (2013.01); G06F 13/4278 (2013.01); *G06F 2213/0026* (2013.01); *H04L 69/16* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,658,448 | B1 * | 12/2003 | Stefaniak | G06F 9/5033 712/1 |
| 7,467,243 | B2 * | 12/2008 | Rashid | H04L 49/00 709/233 |
| 8,625,427 | B1 * | 1/2014 | Terry | 370/235 |
| 2008/0270599 | A1 * | 10/2008 | Tamir | H04L 41/0803 709/224 |
| 2009/0031070 | A1 * | 1/2009 | Purcell | H04L 45/00 710/316 |
| 2009/0144508 | A1 * | 6/2009 | Freimuth | G06F 12/1027 711/145 |
| 2014/0129741 | A1 | 5/2014 | Shahar et al. | |
| 2018/0004703 | A1 * | 1/2018 | Sharma | G06F 13/4282 |

OTHER PUBLICATIONS

PCI Express® Base Specification, Revision 3.1, 1073 pages, Mar. 2014.

* cited by examiner

*Primary Examiner* — Elias Mamo
(74) *Attorney, Agent, or Firm* — Kligler & Associates

(57) ABSTRACT

A plurality of Peripheral Component Interconnect Express (PCIe) endpoints of a multi-socket network interface device are attached to a host for exchanging ingress traffic and egress traffic. An operating system of the host includes a bonding/teaming module having a plurality of network interfaces. The bonding/teaming module is configured to select one of the endpoints for the egress traffic. The network interface device has a hardware bond module configured to steer the ingress traffic to designated ones of the endpoints.

26 Claims, 2 Drawing Sheets

MULTI-PCIE SOCKET NIC OS INTERFACE

CROSS-REFERENCE TO RELATED APPLICATIONS

This Application claims the benefit of U.S. Provisional Application No. 62/458,045, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to interprocessor communication. More particularly, this invention relates to interconnection networks that link processors having diverse operating systems.

2. Description of the Related Art

The meanings of certain acronyms and abbreviations used herein are given in Table 1.

TABLE 1

| \
| Acronyms and Abbreviations |
|---|---|
| BTH | Base Transport Header |
| CPU | Central Processing Unit |
| DPDK | Data Plane Development Kit |
| ETH | Ethernet |
| FPGA | Field-Programmable Gate Array |
| FW | Firmware |
| HW | Hardware |
| IB | InfiniBand |
| IPoIB | Internet Protocol Over InfiniBand |
| IRQ | Interrupt Request |
| LBFO | Load Balancing Failover |
| ND/K | Windows Network Direct/Kernel |
| NDIS | Network Device Interface Specification |
| NIC | Network Interface Card |
| OS | Operating System |
| PCIe | Peripheral Component Interconnect Express |
| PF | Physical Function |
| QP | Queue Pair |
| QPI | QuickPath Interconnect |
| RFS | Receive Flow Steering |
| RoCE | RDMA over Converged Ethernet |
| TCP/IP | Transmission Control Protocol/Internet Protocol |
| XPS | Transmit Packet Steering |

Advanced server network adapters can support multi PCIe endpoint connectivity to the PCIe root complex. This is established through the use of multiple physical functions, i.e., exposed PCIe functions in a network device. Such methods allow a CPU socket over a server platform to use local PCIe access to the device instead of using a socket interconnect channel. Each CPU socket can use local processor memory for I/O transactions for each said PF, which results in both local CPU memory access and local memory DMA access from the device.

For example commonly assigned U.S. Patent Application Publication No. 2014/0129741 by Shahar et al., which is herein incorporated by reference, describes establishing in a peripheral device multiple PCIe links with respective hosts. The hosts are served simultaneously by the peripheral device over the respective communication links.

SUMMARY OF THE INVENTION

Aspects of the invention concern exposure of a Multi-PCIe Socket NIC to the operating system and network stack to create a defined network interface for use by applications. In conventional operating system networking a dedicated network interface registration in the network stack is maintained for each PCIe physical function. In a multi-PCIe Socket NIC environment this results in exposing multiple network interfaces per physical function to a single NIC. There are two important flaws in this approach:

(1) Network administrators are required to maintain multiple network stacks for each network port, for both discovery and addressing.

(2) Applications may need to be modified in order to make use of multiple network interfaces. The modifications enable an application to choose on a per thread basis the local device that is executing an I/O operation.

According to aspects of the invention bonding/teaming technology is exploited in order to team multiple operating system network interfaces of a single device using a modified bonding/teaming module. Functionally, applications see a single interface, which is agnostic to the host operating system.

For TCP/IP traffic a slave, i.e., a network stack interface, is selected according to transmission queue affinity. In a receive operation, accelerated RFS indicates to the NIC which slave to use per flow.

For RDMA and User mode Ethernet traffic a slave is selected according to an affinity attribute in a transport object, e.g., Cr. The QPn namespace is divided among the slaves, and a QPn-to-slave mapping is used in receive operations from either a BTH or from flow steering actions.

In these arrangements hardware resources are not shared by different CPU sockets. Rather each device has its own resources.

There is provided according to embodiments of the invention a method, which is carried out by attaching a plurality of Peripheral Component Interconnect Express (PCIe) endpoints of a multi-socket network interface device to a host, exchanging ingress traffic and egress traffic with the host through the network interface device, and providing in an operating system of the host a bonding/teaming module having a plurality of network interfaces. The bonding/teaming module is configured to select one of the endpoints for the egress traffic. The network interface device has a hardware bond module configured to steer the ingress traffic to designated ones of the endpoints.

According to an aspect of the method, exchanging traffic includes exchanging traffic between the network interface device and a data network connected to the network interface device.

According to another aspect of the method, the bonding/teaming module is configured to select one of the endpoints according to a PCIe endpoint affinity for transmission of the traffic using a selected one of the network interfaces.

According to still another aspect of the method, the traffic is exchanged using transmission control protocol/internet protocol (TCP/IP).

According to yet another aspect of the method, the bonding/teaming module is configured to designate a transmit queue according to a central processing unit (CPU) affinity within the selected one of the endpoints.

According to one aspect of the method, the bonding/teaming module is configured to select one of the endpoints by associating a CPU socket with a creation thread core according to a thread core affinity.

According to a further aspect of the method, associating a CPU socket includes associating a slave structure ib_device that is matched to one of the endpoints.

According to a further aspect of the method, exchanging traffic is performed by remote data memory access.

According to yet another aspect of the method, a transport protocol includes for the traffic includes an InfiniBand protocol, wherein a transport object is a queue pair.

According to one aspect of the method, the hardware bond module has a transport object namespace that is shared among PCIe devices.

According to still another aspect of the method, the hardware bond module is configured to match predefined rules with packet information contained in a header thereof or in a payload thereof.

According to an additional aspect of the method, the endpoints are linked by a direct socket interconnect, and the bonding/teaming module is configured to select one of the endpoints so as to avoid transmitting traffic through the direct socket interconnect.

There is further provided according to embodiments of the invention an apparatus, including a host connected to a multi-socket network interface device. An operating system in the host includes a bonding/teaming module that controls a plurality of network interfaces. The network interface device is operative for exchanging including ingress traffic and egress traffic with the host. The network interface device has a plurality of P Peripheral Component Interconnect Express (PCIe) endpoints and a hardware bond module configured to select the endpoints for the ingress traffic. The bonding/teaming module is configured to select the endpoints for the egress traffic.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

A multi-PCIe Socket NIC is a device comprising multiple physical connections to the PCIe bus root complex (the controller of the PCIe bus). The root complex connects the processor and memory subsystem to the PCI Express switch fabric composed of one or more switch devices. Each such connection may include a single PCIe endpoint connected to the root complex, e.g., via a PCIe switch or PCIe bridge or directly.

Definitions

Multiple operating systems are discussed in this disclosure, which employ varying terminology to generally describe their respective link aggregation facilities for load-balancing, redundancy and failover (LBFO). These variants are collectively referred to herein as "bonding/teaming" functions or modules. The expression "bonding/teaming" is also used herein for convenience to denote the achievement of link aggregation using bonding/teaming modules or functions.

System Description.

Figure 1:
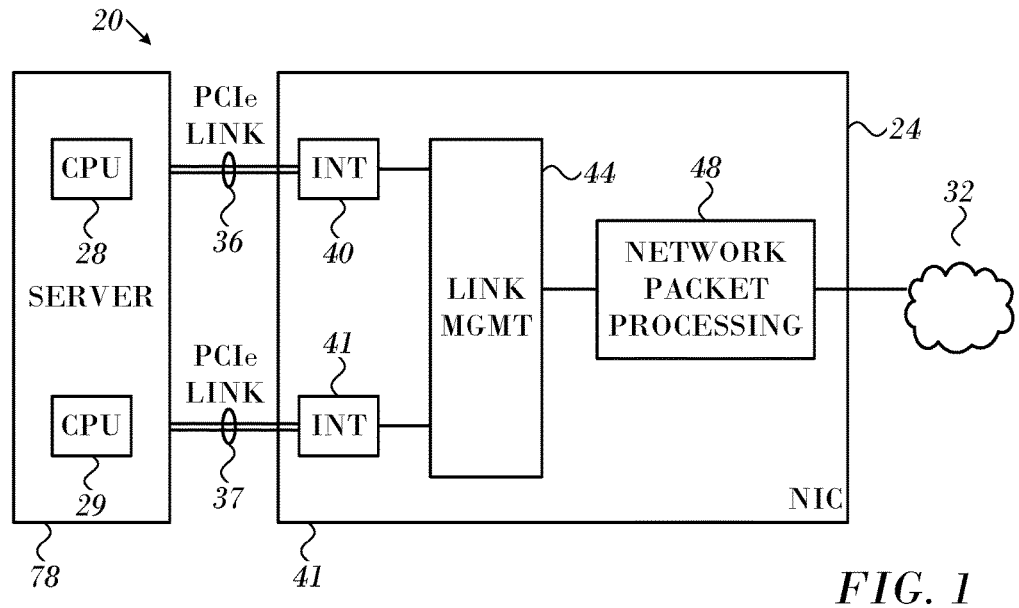
FIG. 1 is a block diagram that schematically illustrates a computing system in accordance with an embodiment of the present invention.

Turning now to the drawings, reference is initially made to FIG. 1, which is a block diagram that schematically illustrates a computing system 20, in accordance with an embodiment of the present invention. System 20 comprises a multi-PCIe socket network interface card 24 (NIC) that connects to a communication network 32.

NIC 24 is presented herein as an example of a peripheral device that is capable of serving multiple hosts simultaneously, and in the present example is configured with multiple PCIe links 36, 37 to a single server 78 having multiple cores or CPUs 28, 29. Each of links 36, 37 may comprise one or more PCIe lanes, each lane comprising a bidirectional full-duplex serial communication link (e.g., a differential pair of wires for transmission and another differential pair of wires for reception). Links 36, 37 may comprise the same or different number of lanes. A packet-based communication protocol, in accordance with the PCIe interface specification, is defined and implemented over each of the links 36, 37.

NIC 24 comprises interface modules 40, 41, for communicating over PCIe links 36, 37 with CPUs 28, 29, respectively. A PCI link management unit 44 manages the two PCIe links using methods that are described in detail below. In particular, unit 44 presents each of the links 36, 37 to the respective CPUs 28, 29 as the only PCIe link existing with NIC 24. In other words, unit 44 causes each CPU to operate as if NIC 24 is assigned exclusively to that CPU, even though in reality the NIC 24 serves multiple CPUs in the server 78.

NIC 24 further comprises a communication packet processing unit 48, which exchanges network communication packets between the CPUs 28, 29 (via unit 44) and network 32. (The network communication packets, e.g., Ethernet frames or InfiniBand packets, should be distinguished from the PCIe packets exchanged over the PCIe links.)

The system and NIC configurations shown in FIG. 1 are exemplary configurations, which are chosen purely for the sake of conceptual clarity. In alternative embodiments, any other suitable system and/or NIC configuration can be used. Certain elements of processing NIC 24 may be implemented using hardware, such as using one or more application-specific integrated circuits (ASICs) or field-programmable gate arrays (FPGAs). Alternatively, some NIC elements may be implemented in software or using a combination of hardware and software elements.

In some embodiments, certain functions of NIC 24, such as certain functions of unit 44, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Teaming Operating System Network Interfaces.

Teaming multiple operating system network interfaces of a network element is accomplished using modifications of standard operating system bonding/teaming modules. Bonding/teaming may be done for TCP/IP network interfaces, e.g., Linux structure net_device; Windows Network Device Interface Specification. Teaming may also serve RDMA devices, e.g., Linux ib_device, Windows ND/K from the perspective of an operating system-agnostic network interface exposed to the network stack. Thus, applications can be left unchanged and enjoy the benefits of a multi-PCIe NIC transparently.

Figure 2:
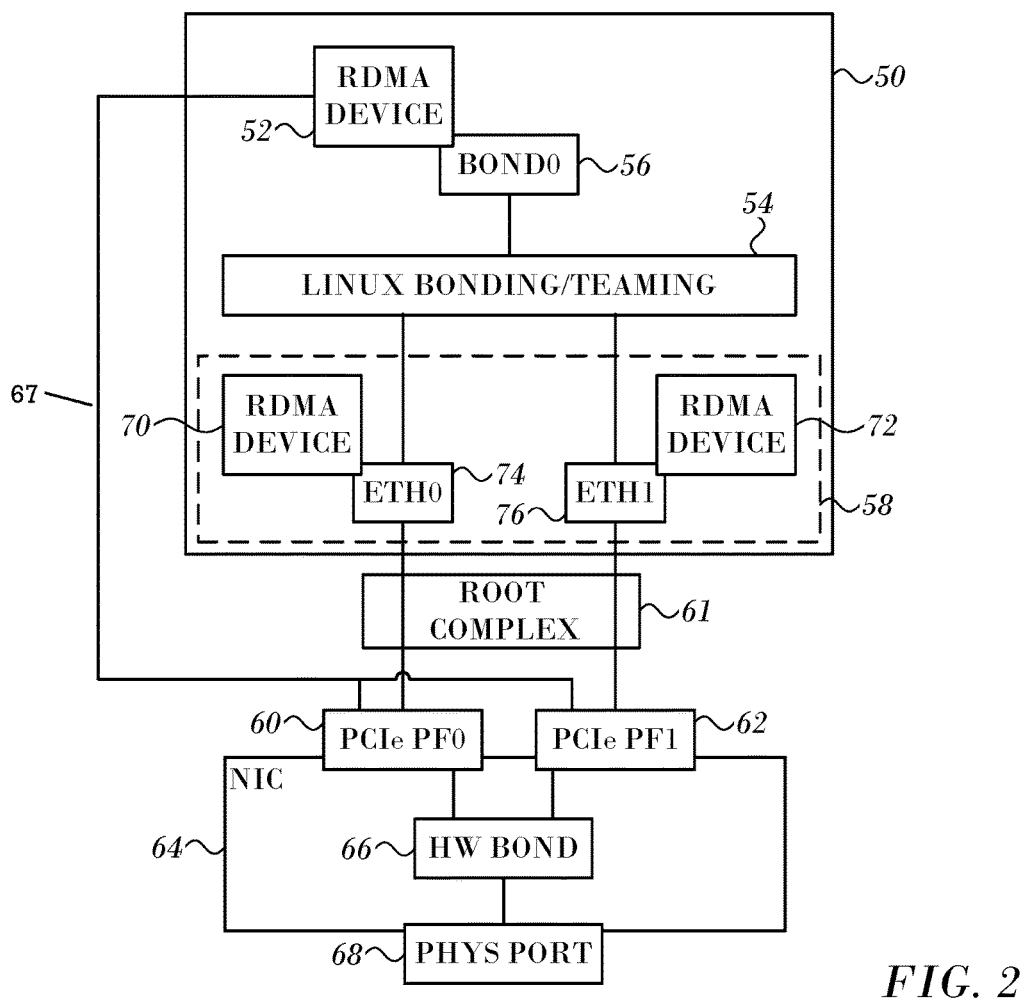
FIG. 2 is a block diagram illustrating an arrangement for exposing a single network interface for TCP/IP and RDMA stacks in a multi-PCIe Socket NIC in accordance with an embodiment of the invention.

Reference is now made to FIG. 2, which is a block diagram illustrating an arrangement for exposing a single network interface for TCP/IP and RDMA stacks in a multi-PCIe Socket NIC in accordance with an embodiment of the invention. Although portions of the arrangement shown in FIG. 2 are shown as comprising a number of separate functional blocks, these blocks are not necessarily separate physical entities, but rather may represent, for example, different computing tasks or data objects stored in a memory that is accessible to a processor. These tasks may be carried out in software running on a single processor, or on multiple processors. The software may be provided to the processor or processors on tangible non-transitory media, such as CD-ROM or non-volatile memory. Alternatively or additionally, the processor may comprise a digital signal processor, field programmable gate array or hard-wired logic.

FIG. 2 illustrates an aspect of a host operating system 50. In the discussion that follows the Linux operating system is chosen as an example. It will be apparent to those skilled in the art to substitute corresponding facilities and modules of other operating systems mutatis mutandis.

An RDMA device 52 is shown as a block. The RDMA device 52 is linked to bonding/teaming module 54 by a bond 56 (bond0). The single RDMA device 52 shown in FIG. 2 is representative. Any number of RDMA devices may be present.

Existing operating system modules such as the Linux (and Windows) bonding/teaming module 54 are modified to support a scheme wherein multiple socket network interfaces form an interface group 58, which is implemented in a single operating system routing table of IP addresses by enslavement to the bonding/teaming module 54. For example, bond 56 is a single interface that is associated with a single IP address, which represents all the interfaces in interface group 58. In another example, bond 56 may include multiple IP addresses, for each IP address a different routing table entry may be included. For example, in FIG. 2, two RDMA devices 70, 72 are registered as structures ib_device in the interface group 58, associated with network stack interfaces eth0 74 and eth1 76. PCIe physical functions 60, 62 are provided in NIC 64, which is linked to the operating system 50 of the host. Within NIC 64 is logical circuitry 66, which can be implemented in firmware or hardware to form a bond (HW bond) that links between the physical functions 60, 62 to the physical port 68, which is connected to a network, and supports the inventive arrangement as explained below. The NIC 64 has any number of physical ports, here represented by port 68. The port 68 is operated using known mechanisms for implementing transmission and receive queues according to a given transmission scheme, e.g., InfiniBand.

TCP/IP Network Traffic.

The Linux bonding/teaming module is conventionally configured using a 'mode' attribute. This attribute defines the behavior of traffic distribution on egress flow and the manner that an enslaved physical function, i.e., a structure net_device of the network stack interfaces eth0 74 and eth1 76 is selected for transmission. Linux features known as receive flow steering (RFS), transmit packet steering (XPS), and IRQ affinity allow control of affinities between CPUs and network queues.

Send Operation.

Each TCP socket, which is an endpoint instance defined, for example, by an IP address and a port in the context of either a particular TCP connection or the listening state, includes transmission information (e.g., struct sock skc tx_queue_mapping), which is used to select a local structure net_device transmit queue. Typically, such transmit queues hold descriptors of traffic pending transmission through an egress port of a network device. For example, in the embodiment of FIG. 1, a local Linux structure net_device is used in a device tasked with configuring multiple network connections in parallel. In the inventive modification support is added to enable the structure net_device to consolidate and report transmit queue information to an interface of the bonding/teaming module 54 from all the transmit queues of the slave devices, (the network stack interfaces eth0 74 and eth1 76) by including affinity information for each of the queues of the underlying slave devices. The consolidated queue information produced using the structure net_device includes queues in the slave device for each core in a host (not shown) that runs under the operating system 50 includes associations to a particular socket and slave (net device). Thus, on egress a TCP transmission includes queue information that matches the characteristics of the underlying slave device queue. Affinity information may include PCIe endpoint affinity (designation of the optimized multi-PCIe NIC physical function according to a predetermined policy) and CPU socket affinity (within the selected physical function, designate the optimal transmit queue). For example, in FIG. 3, described below, a net device with transmit queues that are associated with cores 94, 96, 98, 100 of socket 86 will always be designated to PCIe physical function 104. Similarly, a net device with transmit queues that are associated with cores 95, 97, 99, 101 of socket 88 will always be designated to PCIe physical function 106.

Based on the consolidated queue information, on TCP/IP transmission, a physical function is selected according to transmission queue affinity.

Receive Operation.

Figure 3:
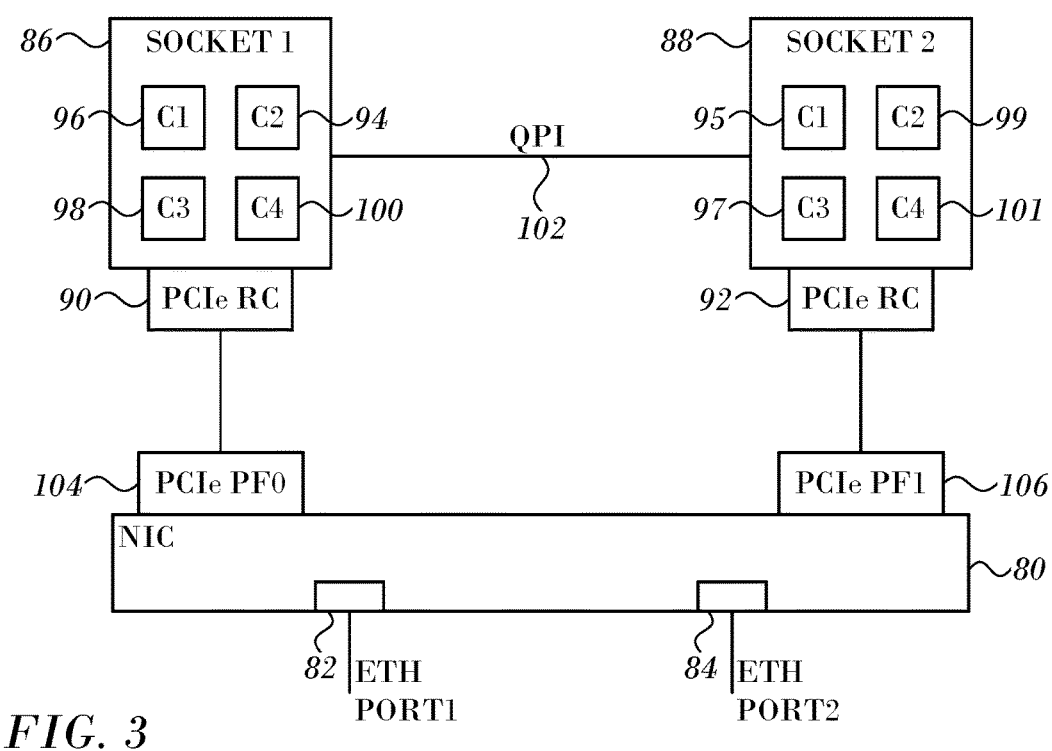
FIG. 3 is a schematic diagram of a PCIe-supported multi-socket NIC, which is operated in accordance with an embodiment of the invention.

In an aspect of the invention a new policy is established for receive operations, which selects the slave structure net_device according to a CPU socket affinity. Reference is now made to FIG. 3, which is a schematic diagram of a PCIe-supported multi-socket NIC 80, which is operated in accordance with an embodiment of the invention. The NIC 80 receives packets from a data network via ports 82, 84 and is connected to CPU sockets 86, 88 using PCIe root complexes 90, 92. Each of the sockets 86, 88 has four cores 94, 96, 98, 100 and cores 95, 97, 99, 101, respectively. In Intel implementations, the CPU sockets 86, 88 are linked by a direct socket interconnect, i.e., an Intel® QuickPath Interconnect, QPI 102 and are associated with PCIe physical functions 104, 106, respectively. While separate PCIe root complexes 90, 92 are shown in FIG. 2, in some embodiments a single PCIe root complex may support both CPU sockets 86, 88.

Linux Accelerated RFS is a hardware-accelerated load balancing mechanism that uses soft state, in which the state of the system may change with time, to steer flows based on where the respective application threads consuming the packets of the flows are running. Using hardware-based ingress traffic steering, accelerated RFS exploits the NIC 5-tuple to invoke ingress queue steering rules, which result in packets being received directly to a CPU local to the thread consuming the data. The target CPU may be the CPU in which an application thread runs, or a CPU, which is local to the application thread's CPU in the cache hierarchy.

In specifying CPU core locality for each ingress queue, the bonding/teaming module 54 becomes aware of slave network device receive queue localities in relation to application threads. In Linux implementations of the invention this fact is exploited by modifying the bonding/teaming module 54 to receive accelerated RFS flows by invoking the Linux device driver function ndo_rx_flow_steer( ) and the matching slave driver function ndo_rx_flow_steer( ) according to the application core that resides in a specific CPU socket affinity and the matching structure net_device that holds a receive queue having the same CPU core affinity. A single net device is associated with a CPU socket, and for each core in that socket, a matching net device receive queue is designated. For example, a structure net device may exclusively designate the socket 86 connected to the root complex 90 for traffic handled by core 96, transparently to the application. In particular, transmission of traffic through the QPI 102 is avoided, which increases system performance.

RDMA Network Traffic.

The Linux RDMA stack allows the operating system to be bypassed when performing certain network I/O operations, in particular remote direct memory operations such as read, write, send and receive operations, such operations may be conducted atomically through connected QP service types and unreliable Internet Protocol over InfiniBand (IPoIB). The I/O operations may also be conducted as user mode Ethernet operations using unreadable service types such as unreliable connection for IPoIB or Raw Packet QP for Ethernet and Data Plane Development Kit (DPDK) service types.

By accessing the Linux structure ib_device, an application can obtain a set of network API calls to be invoked when performing the above operations on a selected device. In one embodiment a structure ib_device may be associated with a structure net_device such that each multi-socket NIC PCIe function has its own copy of the structure net_device and associated structure ib_device.

In order to bypass operating system network I/O using the PCIe function that is closely related to the application core, the following support is added:

Once a network administrator establishes a Linux bond/teaming object having enslaved structures net_devices of the multi-socket NIC PCIe functions, a matching structure ib_device (e.g. RDMA device 52 associated with the structure net_device of bond 56) is created. The creation may be accomplished automatically, using net_device notification events, where the enslaved net devices of the multi-socket NIC structures net_device listen on a net_device enslavement event to detect their enslavement and initiate creation of the bond/teaming object ib_device. RDMA device 52 is associated with the structure net_device of bond 56 for its control path. However, the data path for RDMA device 52 flows directly to its designated physical function via line 67.

Each structure net_device in the bond/teaming object selects its associated structure slave ib_device for performing Linux RDMA stack operations through the following methods:

Explicit—User-assigned Transport object (RDMA QP/RAW ETH QP/DPDK queue) to logical port (and thus PF) affinity on creation phase. Using this method an application developer specifies the transport object (QP) PCIe endpoint affinity explicitly on creation call. Using the QP affinity information the bond/teaming object structure ib_device selects the slave structure ib_device according to an association between the QP affinity to a PCIe endpoint.

Implicit—The transport object (for example QP) creation thread core affinity is used to select the PCIe endpoint by associating creation thread core with CPU Socket and thus underlying slave structure ib_device and matching PCIe endpoint.

Use a transport object CPU core affinity attribute in a creation thread instead of explicit affinity to assign a transport object (QP) affinity. When a QP is created, the associated CPU core that executes it is identified. Then proceed as above to select underlying slave structure ib_device.

By assigning the transport object (QP) affinity in the creation phase, a QP is created on the device that resides on the same PCIe endpoint as the application CPU socket. Thus send operations always use the multi-NIC PCIe function on the same socket as the application CPU.

Receive handling for transport objects like RDMA QP/RAW ETH QP/DPDK queue, which perform OS bypass traffic can be done through matching on any network header or payload offset carried over the network wire protocol and steering to the corresponding transport object PCIe function device.

A simple case is a match in a transport object identity that is carried over the network wire protocol, such as QP number in InfiniBand, or RoCE network protocols. In this case, each transport object (such as QP) has an associated identity number, e.g., QPn. Using the transport header, a multisocket NIC can steer ingress traffic to the matching structure ib_device and thus to the CPU socket that corresponds to the application core.

In order to allow the multi-socket NIC to steer ingress traffic to the structure ib_device in which the transport object was created, a transport object namespace (e.g., QPn) must be shared across all multi-socket NIC associated PCIe functions. This can be achieved by HW/FW policy of sharing the QPn namespace among the team PCIe function members so each PCIe function device will have its own transport object numbering range of the shared namespace.

In a receive operation, the transport object identity (such as

QPn) is taken from the RDMA transport header (e.g., BTH) and steered to the matching PCIe function device.

For RDMA and user mode Ethernet traffic including InfiniBand user verbs (ibv_create_flow steering API call), DPDK (rte_flow) receive steering is done through matching on OSI layers 2/3/4 (MAC/IP/UDP) header attributes and followed by steering to the corresponding transport object. Once the steering API call is invoked on the transport object, the transport object affinity information that was set on the object creation time is used to push the steering rule to the associated structure ib_device, i.e. The structure ib_device that was used for creating the transport object.

Hardware Bond.

In order to perform transmit and receive operation from and to a selected PCIe function, appropriate hardware and firmware logic is required to forward ingress traffic to the appropriate RDMA device registered in the bonding/teaming module. This logic includes:

1. Steering info and steering ingress traffic according to defined matching rules in order to steer ingress traffic. In some embodiments layer 2/3 network addresses may be same for all underlying multi-socket NIC devices using a single shared address associated with the bond. In other embodiments of the invention, HW/FW bond logic is required to support a more granular matching scheme, such as 5-tuple steering for accelerated RFS, inner and outer header information in case of tunneling and overlay networks usage or L7 application payload offset in cases of receive queue steering based on application payload data usage. Such functionality is added to the Multi PCIe function Ethernet switching logic.

2. Establishing shared transport object namespace for all PCIe function devices such that allows creating unique identity of an object per PCIe device and steering traffic to the corresponding PCIe device according to its identity as described earlier.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
   attaching a plurality of Personal Computer Interface Express (PCIe) endpoints of a multi-socket network interface device to a host, the endpoints being linked to at least one slave device in a communications network;
   exchanging traffic via the endpoints between the at least one slave device and the host through the network interface device, the traffic including ingress traffic and egress traffic;
   providing in an operating system of the host a bonding/teaming module having a plurality of network interfaces, the bonding/teaming module being configured to maintain consolidated transmit queue information from the at least one slave device and to select one of the endpoints for the egress traffic according to a PCIe endpoint affinity of the egress traffic for the endpoints the PCIe endpoint affinity being measured by the transmit queue information; and
   providing in the network interface device a hardware bond module configured to steer the ingress traffic to a designated one of the endpoints.

2. The method according to claim 1, wherein the bonding/teaming module is configured to designate a transmit queue according to a central processing unit (CPU) affinity within the selected one of the endpoints.

3. The method according to claim 1, wherein the bonding/teaming module being configured to select one of the endpoints by associating a CPU socket with a creation thread core according to a thread core affinity.

4. The method according to claim 3, wherein associating a CPU socket comprises associating a slave structure ib_device that is matched to one of the endpoints.

5. The method according to claim 3, wherein exchanging traffic is performed by remote data memory access.

6. The method according to claim 5, wherein a transport protocol comprises for the traffic comprises an InfiniBand protocol, wherein a transport object is a queue pair.

7. The method according to claim 1, wherein the hardware bond module has a transport object namespace that is shared among PCIe devices.

8. The method according to claim 1, wherein the hardware bond module is configured to match predefined rules with packet information contained in a header thereof or in a payload thereof.

9. The method according to claim 1, wherein the endpoints are linked by a direct socket interconnect, and the bonding/teaming module is configured to select one of the endpoints so as to avoid transmitting traffic through the direct socket interconnect.

10. An apparatus, comprising:
    a host having an operating system comprising a bonding/teaming module that controls a plurality of network interfaces, and
    a multi-socket network interface device operative for exchanging traffic with the host, the traffic including ingress traffic and egress traffic, the network interface device having a plurality of Personal Computer Interface Express (PCIe) endpoints and a hardware bond module configured to select one of the endpoints for the ingress traffic, wherein the endpoints are linked to at least one slave device in a communications network, and wherein the bonding/teaming module is configured to maintain consolidated transmit queue information from the at least one slave device and to designate one of the endpoints for the egress traffic according to a PCIe endpoint affinity of the egress traffic for the endpoints the PCIe endpoint affinity being measured by the transmit queue information.

11. An apparatus, comprising:
    a host having an operating system comprising a bonding/teaming module that controls a plurality of network interfaces, and
    a multi-socket network interface device operative for exchanging traffic with the host, the traffic including ingress traffic and egress traffic, the network interface device having a plurality of Personal Computer Interface Express (PCIe) endpoints and a hardware bond module configured to select one of the endpoints for the ingress traffic, and wherein the bonding/teaming module is configured to designate one of the endpoints for the egress traffic,
    wherein the bonding/teaming module is configured to select one of the endpoints according to a PCIe endpoint affinity for transmission of the traffic using a selected one of the network interfaces.

12. The apparatus according to claim 11, wherein the traffic is exchanged using transmission control protocol/internet protocol (TCP/IP).

13. The apparatus according to claim 10, wherein the bonding/teaming module is configured to designate a transmit queue according to a central processing unit (CPU) affinity within the selected one of the endpoints.

14. The apparatus according to claim 10, wherein the bonding/teaming module being configured to select one of the endpoints by associating a CPU socket with a creation thread core according to a thread core affinity.

15. The apparatus according to claim 14, wherein associating a CPU socket comprises associating a slave structure ib_device that is matched to one of the endpoints.

16. The apparatus according to claim 14, wherein exchanging traffic is performed by remote data memory access.

17. The apparatus according to claim 16, wherein a transport protocol for the traffic comprises an InfiniBand protocol, wherein a transport object is a queue pair.

18. The apparatus according to claim 10, wherein the hardware bond module has a transport object namespace that is shared among PCIe devices.

19. The apparatus according to claim 10, wherein the hardware bond module is configured to match predefined rules with packet information contained in a header thereof or in a payload thereof.

20. The apparatus according to claim 10, wherein the endpoints are linked by a direct socket interconnect, and the bonding/teaming module is configured to select one of the endpoints so as to avoid transmitting traffic through the direct socket interconnect.

21. The method according to claim 1, further comprising:
a) receiving the transmit queue information regarding transmit queues of the at least one slave device; and
b) for respective items of the egress traffic evaluating the PCIe endpoint affinity for the endpoints by matching the received transmit queue information with characteristics of the transmit queues of the at least one slave device linked thereto according to a predetermined policy.

22. The method according to claim 21, wherein the host has a plurality of cores that are associated with respective transmit queues of the at least one slave device and the predetermined policy comprises evaluating affinities with the cores.

23. The method according to claim 1, further comprising configuring the hardware bond module to steer the ingress traffic using Receive Flow Steering (RFS).

24. The method according to claim 23, wherein the host has a plurality of cores, further comprising configuring the hardware bond module to steer the ingress traffic to a selected one of the cores according to a core affinity therewith.

25. A method, comprising the steps of:
attaching a plurality of Personal Computer Interface Express (PCIe) endpoints of a multi-socket network interface device to a host, the endpoints being linked to at least one slave device in a communications network;
exchanging traffic via the endpoints between the at least one slave device and the host through the network interface device, the traffic including ingress traffic and egress traffic;
providing in an operating system of the host a bonding/teaming module having a plurality of network interfaces, the bonding/teaming module being configured to maintain consolidated transmit queue information from the at least one slave device and to select one of the endpoints for the egress traffic according to a central processing unit (CPU) socket affinity of the egress traffic; the CPU socket affinity being measured by the transmit queue information
providing in the network interface device a hardware bond module configured to steer the ingress traffic to a designated one of the endpoints.

26. The method according to claim 25, further comprising configuring the hardware bond module to steer the ingress traffic using Receive Flow Steering (RFS).

\* \* \* \* \*